Patented Aug. 31, 1954

2,688,027

UNITED STATES PATENT OFFICE 2,688,027

RACEMIZATION OF OPTICAL ISOMERS

Howard C. Klein, Brooklyn, N. Y., and Roland Kapp, Newark, N. J., assignors to Nopco Chemical Company, Harrison, N. J., a corporation of New Jersey No Drawing. Application April 22, 1952,
Serial No. 283,768

17 Claims. (Cl. 260—343.6)

The present invention relates generally to a process for the racemization of optical isomers containing an activated hydrogen in the alpha position. More particularly, this invention relates to the racemization of the optical isomers of α-hydroxy-β,β-dimethyl-γ-butyrolactone.

The subject of optical activity, always of interest from the theoretical aspect, becomes of great industrial importance where one of a pair of the optical isomers of a particular substance is valuable and the other is comparatively worthless. Such a situation is encountered in the case of α-hydroxy-β,β-dimethyl-γ-butyrolactone. L-α-hydroxy-β,β-dimethyl-γ-butyrolactone finds wide use at present in the synthesis of the physiologically active d-pantothenic acid or its salts by reaction with β-alanine or its salts. The condensation of d-α-hydroxy-β,β-dimethyl-γ-butyrolactone with β-alanine or its derivatives, on the other hand, gives the physiologically inactive laevorotatory isomer of pantothenic acid. Hence, it has been the practice to resolve the racemic mixture of d- and l-lactones to recover the desired l-lactone prior to reaction with β-alanine. The other product of the resolution, d-lactone, is substantially worthless, and it has been for some time the endeavor of the art to provide for the utilization of this useless by-product. Thus, it has been proposed to racemize the di-lactone by heating it with an aqueous solution of a sodium salt in an autoclave under pressure. It has also been proposed to conduct the heating in the conjoint presence of various catalytic agents and solvents. These methods have, however, been subject to certain disadvantages, such as the use of costly pressure equipment and the necessity of removing the solvent from the racemic mixture of d- and l-lactones. It is evident, therefore, that the development of a simple yet effective racemization procedure is extremely desirable. The present invention makes such a process available to the art.

It is an object of this invention to provide a process for the racemization of optical isomers containing an activated hydrogen in the alpha position.

It is another object of this invention to provide a process for the racemization of optical isomers of α-hydroxy-β,β-dimethyl-γ-butyrolactone.

It is a further object of this invention to provide a process for the conversion of d-α-hydroxy-β,β-dimethyl-γ-butyrolactone to the more desirable laevo-isomer.

It is an object of this invention to provide a process for the most complete utilization of a substance existing in enantiomorphous forms.

It has been discovered in accordance with the present invention that these and other objects can be achieved by heating the optical isomer with an alkali metal silicate in the absence of any solvent. In the preferred practice of the invention α-hydroxy-β,β-dimethyl-γ-butyrolactone is heated with sodium silicate at a temperature of about 145–150° and for a period of time sufficient to effect the desired degree of racemization.

The invention is not limited to the conditions referred to above. The temperature may be varied over a wide range, any temperature between the melting point and the boiling point of the optical isomer serving to effect the desired racemization. It is evident that the time of treatment may likewise be varied over a considerable range, depending on the temperature used and the degree of racemization desired. Generally, however, the treatment is carried out over a period of from 3½ to 16 hours.

It has also been found that the ratio of alkali metal silicate to optical isomer can be varied over a wide range. For efficient and practical commercial use the alkali metal silicate should be used in the proportions of from 0.5% to 30% based on the weight of the optical isomer. Optimum results are achieved when the proportion of alkali metal silicate to the optical isomer is from 1.5 to 4.0%, and in the preferred embodiment of the invention about 4% by weight of alkali metal silicate is used. While the use of quantities of alkali metal silicate in excess of 30% by weight will effect racemization and thus is within the scope of our invention the use of such larger quantities is attended by a decomposition of the lactone. Even though this decomposition is not complete it greatly reduces the efficiency of the process and hence the use of quantities of alkali metal silicate in excess of about 30% should be avoided. Similarly, the use of the alkali metal silicate in quantities below 0.5% by weight, while effective in bringing about racemization and therefore is within the scope of the present invention, results in a decrease in the rate of racemization attended by a corresponding reduction in the efficiency of the process and should likewise be avoided.

The relationship between the conditions of time, temperature and concentration of catalyst can be stated in the following terms: at any given temperature and given time the rate of racemization is dependent upon the catalyst concentration and can be accelerated by increasing the catalyst concentration, up to the point at which tar formation occurs; at any given catalyst concentration and given time the rate of racemization is dependent upon the temperature which is used and can be accelerated by increasing the temperature any desired amount up to and including the reflux temperature of the lactone; at any given catalyst concentration and given temperature the extent of the racemization is dependent upon the time and can be increased by extending the period of time over which the heating is carried out. In brief, the rate of racemization is dependent upon the catalyst concentration and temperature which are used while the extent of racemization is dependent upon the time of heating.

*Example I*

25.0 grams of 1-α-hydroxy-β,β-dimethyl-γ-butyrolactone $(\alpha)_D = -42.9$ were admixed with 1.0 gram of dry powdered sodium silicate. The mixture was heated to 145–148° C., and held at this temperature for about 3½ hours, stirring continuously. At the end of 3½ hours, the lactone was distilled in virtually quantitative yield, the resulting racemic mixture having $(\alpha)_D = -2.2$, equivalent to a racemization of 95.6%. The dry powdered sodium silicate used in this example and in Examples II, III and IV, hereinafter, was provided in the form of sodium tetra-silicate.

*Example II*

In another experiment the process of Example I was repeated except that the mixture of lactone and sodium silicate powder was held at the elevated temperature for about 16 hours. The product had $(\alpha)_D = -0.01$ corresponding to a racemization of 99.98%.

*Example III*

10.0 grams of d-α-hydroxy-β,β-dimethyl-γ-butyrolactone, $(\alpha)_D = +48.9$, and 0.400 gram of dry, powdered sodium silicate were stirred for 3½ hours at 145–148° C. At the end of this period the lactone was distilled at 109–110° C. and at 5 mm. pressure. A 95% yield of racemized lactone $(\alpha)_D = +0.22$, equivalent to 99.56% racemization, was obtained.

*Example IV*

50 grams of 1-α-hydroxy-β,β-dimethyl-γ-butyrolactone $(\alpha)_D = -42.9$ were stirred with 15.0 grams of sodium silicate at 143–145° C. for a period of about 18 hours. At the end of this period the lactone was distilled, a 40 gram yield being obtained. The d,l-lactone, $(\alpha)_D = -0.29$, was 99.8% pure, and was 99.4% racemized. A tarry residue, insoluble in water, remained. This example indicates that while larger quantities of base can be employed use of such quantities is not desirable due to the attendant decomposition of the lactone.

*Example V*

50 grams of 1-α-hydroxy-β,β-dimethyl-γ-butyrolactone, $(\alpha)_D = -49.8$, were admixed with 0.25 grams of dry powdered sodium silicate in the form of sodium metasilicate. The mixture was heated to 145° C. and held at this temperature for about 15 minutes. At the end of this period the product was found to have $(\alpha)_D = -23.6$, corresponding to a racemization of 52.8%. This example shows that the catalyst can be used in amounts as low at 0.5% by weight and still effect racemization of the lactone.

*Example VI*

50 grams of 1-α-hydroxy-β,β-dimethyl-γ-butyrolactone $(\alpha)_D = -49.8$ were heated to a temperature of 146° C. and at this point 1% by weight of sodium metasilicate was added. $(\alpha)_D$ determinations were made on specimens after maintenance at 146° C. for one-half hour and one hour respectively. The $(\alpha)_D$ of the product after one-half hour was found to be $(\alpha)_D = -23.6$, equivalent to a racemization of 52.8%. After one hour it was found that the product had $(\alpha)_D = -13.1$, corresponding to a racemization of 73.8%. This example demonstrates the effect of the duration of the heating operation on the extent of racemization.

*Example VII*

This experiment repeated the process of the preceding example, Example VI, except that the amount of sodium metasilicate which was added was increased to 1.6% by weight. The product obtained after maintenance at about 146° C. for one-half hour had $(\alpha)_D = -1.55$, corresponding to a racemization of 96.9%. After maintenance at this temperature for one hour the racemic mixture had $(\alpha)_D = -0.1$, corresponding to a racemization of 99.8%. A comparison of the results of this example with those of Example VI clearly demonstrates the effect of an increase in catalyst concentration on the rate of racemization.

*Example VIII*

25 grams of 1-α-hydroxy-β,β-dimethyl-γ-butyrolactone, $(\alpha)_D = -49.8$, were heated to a temperature of about 110° C. and at this point 1.6% by weight of sodium metasilicate was admixed therewith. At the end of one hour at this temperature the product was found to have $(\alpha)_D = -7.83$, equivalent to a racemization of 84.34%. A comparison with Example VII, wherein the same conditions of catalyst concentration and time of heating were employed, shows that the use of the lower temperatures of this example retarded the rate of racemization. The results of the present example do indicate, however, that the use of lower temperatures in effecting the racemization is entirely suitable.

*Example IX*

25 grams of 1-α-hydroxy-β,β-dimethyl-γ-butyrolactone, $(\alpha)_D = -50.1$, were admixed with 4% by weight of sodium metasilicate. The mixture was heated to about 145–148° C. and held at this temperature for a period of 16 hours. At the end of this period the lactone was distilled, a 22 gram yield being obtained. The product had $(\alpha)_D = -0.02$, equivalent to a racemization of 99.96%.

*Example X*

25 grams of 1-α-hydroxy-β,β-dimethyl-γ-butyrolactone, $(\alpha)_D = -49.8$, were heated to a temperature of about 145° C. At this point 2% by weight of sodium orthosilicate was added and the mixture was maintained at about 145° C. for a period of about two hours. At the end of this period the lactone was distilled and the racemic mixture was found to have $(\alpha)_D = -8.38$, equivalent to a racemization of 83.2%.

*Example XI*

18.5 grams of 1-α-hydroxy-β,β-dimethyl-γ-butyrolactone were heated to a temperature of about 145° C.; 4% by weight of potassium silicate was then admixed therewith and the mixture was held at about 145° C. for two hours. At the end of this period the lactone was distilled, the product having $(\alpha)_D = -13.9$, corresponding to a racemization of 72.8%. The potassium silicate used in this example was provided in the form of potassium tetrasilicate.

The invention is not limited to the use of a particular alkali metal silicate or to any particular form thereof, but embraces the use of all of the alkali metal silicates, in any of the forms in which they exist, for the racemization of optical isomers.

The racemic mixture of d- and l-lactones obtained by the methods illustrated in the foregoing examples can be readily resolved by any of the well known resolution procedures to yield the desired isomer. Thus, the racemic mixture of optical isomers can be converted into diastereoisomers by the addition of an optically active base, and the resultant salts separated by fractional crystallization. When the separation is complete the optically active base is split off by treatment with a strong alkali or acid yielding the pure enantiomorphic forms. The particular method of resolution, however, forms no part of the present invention which is concerned solely with the racemization procedure.

While the examples have all disclosed the separation of the lactone from the reaction mixture by the distillation thereof it is obvious that other means can be used for effecting the separation of the racemate. Thus, the alkali metal silicate, which is insoluble in the lactone, can be separated therefrom by means of filtration. The particular manner of separation to be employed is a matter which can readily be determined by one skilled in the art to which the invention pertains and the present invention is in no way limited to the use of any particular means for effecting the separation of the lactone.

Among the advantages of the present invention the following features may be briefly pointed out. The racemization procedure of the present invention eliminates the solvents utilized in prior art methods, and simplifies the procedure by obviating the need for the step of removing the solvent. Thus, the applicants' invention accomplished two objectives towards which all industries strive; namely, it eliminates both a previously necessary material and a previously essential step. The productivity of each production unit will thereby be increased since the process will not require the close attention which is necessary where a solvent is employed. The present invention will also result in more satisfactory working conditions through the elimination of a material which is always a potential health and safety hazard. The process of the present invention enjoys the further advantage of making use of an extremely cheap and stable base. And it avoids the necessity for relactonization with acid, with the subsequent steps of neutralization, extraction, drying, etc., characteristic of the procedure previously known to the art. As a corollary of the desirable features which have been briefly referred to, it is obvious that the racemization procedure which we have disclosed is carried out with a considerable economy in time, in labor, and in cost.

Although the invention has been illustrated and described in its preferred embodiment, it will be obvious that various changes may be made therein without departing from the spirit of the invention or the scope of the appended claims.

Having described our invention, what we claim to be new and wish to secure by Letters Patent is:

1. A process for the racemization of an optical isomer selected from the group consisting of d-$\alpha$-hydroxy-$\beta,\beta$-dimethyl-$\gamma$-butyrolactone and 1-$\alpha$-hydroxy-$\beta,\beta$-dimethyl-$\gamma$-butyrolactone which comprises heating said isomer with an alkali metal silicate.

2. A process for the racemization of an optical isomer selected from the group consisting of d-$\alpha$-hydroxy-$\beta,\beta$-dimethyl-$\gamma$-butyrolactone and 1-$\alpha$-hydroxy-$\beta,\beta$-dimethyl-$\gamma$-butyrolactone which comprises heating said isomer with an alkali metal silicate at a temperature of from about the melting point of said isomer to about the boiling point of said isomer.

3. A process according to claim 2 in which the optical isomer is 1-$\alpha$-hydroxy-$\beta,\beta$-dimethyl-$\gamma$-butyrolactone and the alkali metal silicate is a sodium silicate.

4. A process according to claim 2 in which the optical isomer is 1-$\alpha$-hydroxy-$\beta,\beta$-dimethyl-$\gamma$-butyrolactone and the alkali metal silicate is a potassium silicate.

5. A process according to claim 2 in which the optical isomer is d-$\alpha$-hydroxy-$\beta,\beta$-dimethyl-$\gamma$-buytrolactone and the alkali metal silicate is a sodium silicate.

6. A process according to claim 2 in which the optical isomer is d-$\alpha$-hydroxy-$\beta,\beta$-dimethyl-$\gamma$-butyrolactone and the alkali metal silicate is a potassium silicate.

7. A process for the racemization of an optical isomer selected from the group consisting of d-$\alpha$-hydroxy-$\beta,\beta$-dimethyl-$\gamma$-butyrolactone and 1-$\alpha$-hydroxy-$\beta,\beta$-dimethyl-$\gamma$-butyrolactone which comprises heating said isomer with an alkali metal silicate at a temperature of about 145° C.

8. A process according to claim 7 in which the alkali metal silicate is used in the amount of from 0.5% to 30% by weight.

9. A process according to claim 8 in which the heating is carried out over a period of from 3½ to 16 hours.

10. A process according to claim 9 in which the alkali metal silicate is used in the amount of from 1.5% to 4.0% by weight.

11. A process according to claim 10 in which the optical isomer is d-$\alpha$-hydroxy-$\beta,\beta$-dimethyl-$\gamma$-butyrolactone.

12. A process according to claim 11 in which the alkali metal silicate is used in the amount of about 4% by weight.

13. A process for the racemization of an optical isomer selected from the group consisting of d-$\alpha$-hydroxy-$\beta,\beta$-dimethyl-$\gamma$-butyrolactone and 1-$\alpha$-hydroxy-$\beta,\beta$-dimethyl-$\gamma$-butyrolactone which comprises heating said isomer with a sodium silicate at a temperature of about 145° C.

14. A process for the racemization of an optical isomer selected from the group consisting of d-$\alpha$-hydroxy-$\beta,\beta$-dimethyl-$\gamma$-butyrolactone and 1-$\alpha$-hydroxy-$\beta,\beta$-dimethyl-$\gamma$-butyrolactone which comprises heating said isomer with from 0.5% to 30% by weight of sodium silicate at a temperature of about 145° C. for a period of from about 3½ to about 16 hours.

15. A process according to claim 14 in which the sodium silicate is used in the amount of from 1.5% to 4.0% by weight.

16. A process according to claim 15 in which the sodium silicate is used in the amount of about 4% by weight and the period of heating is about 3½ hours.

17. A process according to claim 16 in which the optical isomer is d-$\alpha$-hydroxy-$\beta,\beta$-dimethyl-$\gamma$-butyrolactone.

References Cited in the file of this patent

UNITED STATES PATENTS

| Number | Name | Date |
|---|---|---|
| 2,328,000 | Finkelstein | Aug. 31, 1943 |
| 2,377,390 | Weijland et al. | June 5, 1945 |
| 2,434,061 | Weijland et al. | Jan. 6, 1948 |
| 2,463,734 | Beckmann | Mar. 8, 1949 |